US012810746B2

(12) United States Patent
Kang

(10) Patent No.: US 12,810,746 B2
(45) Date of Patent: Nov. 24, 2026

(54) TEACHING AID FOR KNOT TYING PRACTICE

(71) Applicant: SULSUL CO., LTD., Seoul (KR)

(72) Inventor: Soon Joo Kang, Seoul (KR)

(73) Assignee: SULSUL CO., LTD., Seoul (KR)

( * ) Notice: Subject to any disclaimer, the term of this patent is extended or adjusted under 35 U.S.C. 154(b) by 454 days.

(21) Appl. No.: 18/470,020

(22) Filed: Sep. 19, 2023

(65) Prior Publication Data

US 2024/0013676 A1 Jan. 11, 2024

Related U.S. Application Data

(63) Continuation of application No. PCT/KR2021/007553, filed on Jun. 16, 2021.

(30) Foreign Application Priority Data

Mar. 19, 2021 (KR) ........................ 10-2021-0035897

(51) Int. Cl.
*G09B 19/00* (2006.01)

(52) U.S. Cl.
CPC ................................ *G09B 19/0076* (2013.01)

(58) Field of Classification Search
CPC ........ G09B 19/0076; D04G 5/00; D04G 1/00; D04G 3/00; D04G 3/02
See application file for complete search history.

(56) References Cited

U.S. PATENT DOCUMENTS 921,534 A * 5/1909 Fritz ........................ E04H 17/08 52/151
4,186,951 A * 2/1980 Stephenson .............. D04G 5/00 289/16.5
6,217,086 B1 * 4/2001 LeTourneau ........... G09B 19/00 289/1.5
2010/0156101 A1 6/2010 Baldwin
2011/0278842 A1 * 11/2011 Spilbor .............. G09B 19/0076 289/13
2019/0365121 A1 * 12/2019 Hoheisel ................... A47F 7/00

FOREIGN PATENT DOCUMENTS

KR 20120025212 A 3/2012
KR 20150001020 A 1/2015
KR 20160048322 A 5/2016
KR 20170070697 A 6/2017

OTHER PUBLICATIONS

International search report of PCT/KR2021/007553, Dec. 13, 2021, English translation.

* cited by examiner

*Primary Examiner* — Bruk A Gebremichael
(74) *Attorney, Agent, or Firm* — STIP Law Group, LLC

(57) ABSTRACT

The present invention relates to a teaching aid for knot tying practice, the teaching aid enabling a user to easily practice tying various knots such as a knot needed in daily life or a knot for traditional crafts. The teaching aid for knot tying practice of the present invention comprises: a bottom plate (110); a string supporter (120) vertically coupled to as upper part of the bottom plate and having a string hanging groove (121) formed from the top thereof; fixing clips (130, 130*a*) fitted into the top of the string supporter to restrict the movement of a string hung on the string hanging groove; and an inclined supporter (140) coupled to an upper part of the bottom plate to support the string supporter.

7 Claims, 6 Drawing Sheets

TEACHING AID FOR KNOT TYING PRACTICE

TECHNICAL FIELD

The present disclosure relates to a teaching aid for knotting practice, which enables a user to easily practice tying various knots, such as a knot needed in daily life or a knot for traditional crafts.

BACKGROUND ART

In general, knots which intertwine various parts of one or more ropes, cords, or other flexible string vary widely in type, from simple knots necessary for daily life to traditional craft knots.

Such knots are widely used in everyday life. That is, for infants, knots serve as good developmental play for eye-hand coordination and fine motor skills. For the elderly, knots are effective for dementia prevention and strengthening of fine muscles. Moreover, knots are extensively used in various leisure activities such as camping, hiking, mountaineering, and fishing.

Therefore, there has always been a demand to learn various knotting techniques.

Recently, with the rising popularity of hobby activities like making traditional ornaments such as tassels and bracelets, there is an increasing trend in the demand to learn traditional craft knotting.

However, as knots become more complex, the number of strings, the direction in which the string moves, and the number of twists increase. Accordingly, significant attention is required when learning the knotting techniques. Due to the characteristics of strings used in knotting, since the strings are flexible and in a non-fixed state, the shape of the string changes unpredictably and frequently, and handling the string becomes difficult, so it is not easy to learn the knotting method.

For example, when practicing knotting by laying the strings on the floor, it is very difficult to pass a string between another string and the floor. This is because when one string is lifted, another string is inadvertently lifted, and it alters the shape and state of the knot. To prevent it, a user has to hold one string while lifting another, but in this case, since both hands become occupied, it is difficult to create further knots.

As described above, since it is very difficult to learn or teach the knotting method, there is a demand for improving the knotting method.

DISCLOSURE

Technical Problem

Accordingly, the present invention has been made in view of the above-mentioned problems occurring in the related art, and it is an object of the present invention to provide a teaching aid for knotting practice which enables a user to easily handle strings and practice knotting.

Technical Solution

To accomplish the above-mentioned objects, according to the present invention, there is provided a teaching aid for knotting practice including: a bottom plate; a string supporter which is vertically co pled to an upper portion of the bottom plate and having a string hanging groove formed from the top thereof; a fixing clip which is fitted into the top of the string supporter to restrict the movement of a string hung on the string hanging groove; and an inclined supporter which is coupled to the upper portion of the bottom plate to support the string supporter.

Additionally, the string supporter is coupled to at least one of two sides of the bottom plate.

In addition, the string supporter has a strength-reinforcing rib formed in the vertical direction.

Moreover, the string supporter is detachably coupled to the bottom plate, and the bottom plate has a coupling groove formed therein to allow the bottom of the string supporter to be inserted.

Furthermore, the bottom plate has a string supporter storage groove formed therein in which the strength-reinforcing rib is inserted to store the string supporter when the string supporter is separated from the bottom plate.

Additionally, the inclined supporter is detachably coupled to the bottom plate, support protrusions are respectively formed on upper and lower portions of the inclined supporter, and one or more retaining grooves into which the support protrusions are respectively inserted are formed on the bottom plate and string supporter respectively.

Moreover, the inclined supporter has an insertion protrusion formed therein so that the inclined supporter can be stored by being fit into the retaining groove formed in the bottom plate when not in use.

In addition, the bottom plate has a fixing clip storage groove formed therein to store the fixing clip therein.

Advantageous Effect

Due to the string supporters provided on the upper portion of the bottom plate, since a user can practice knotting in a state in which the string needed for the knot is raised to a predetermined height from the bottom plate and is fixed in that position for practice, the teaching aid for knotting practice makes it easier to handle the string and facilitates knotting practice.

In addition, the present invention is configured in such a way that the components of the present invention can be inserted into the bottom plate, thereby providing convenience in carrying and preventing the loss of the components.

MODE FOR INVENTION

Figure 1:
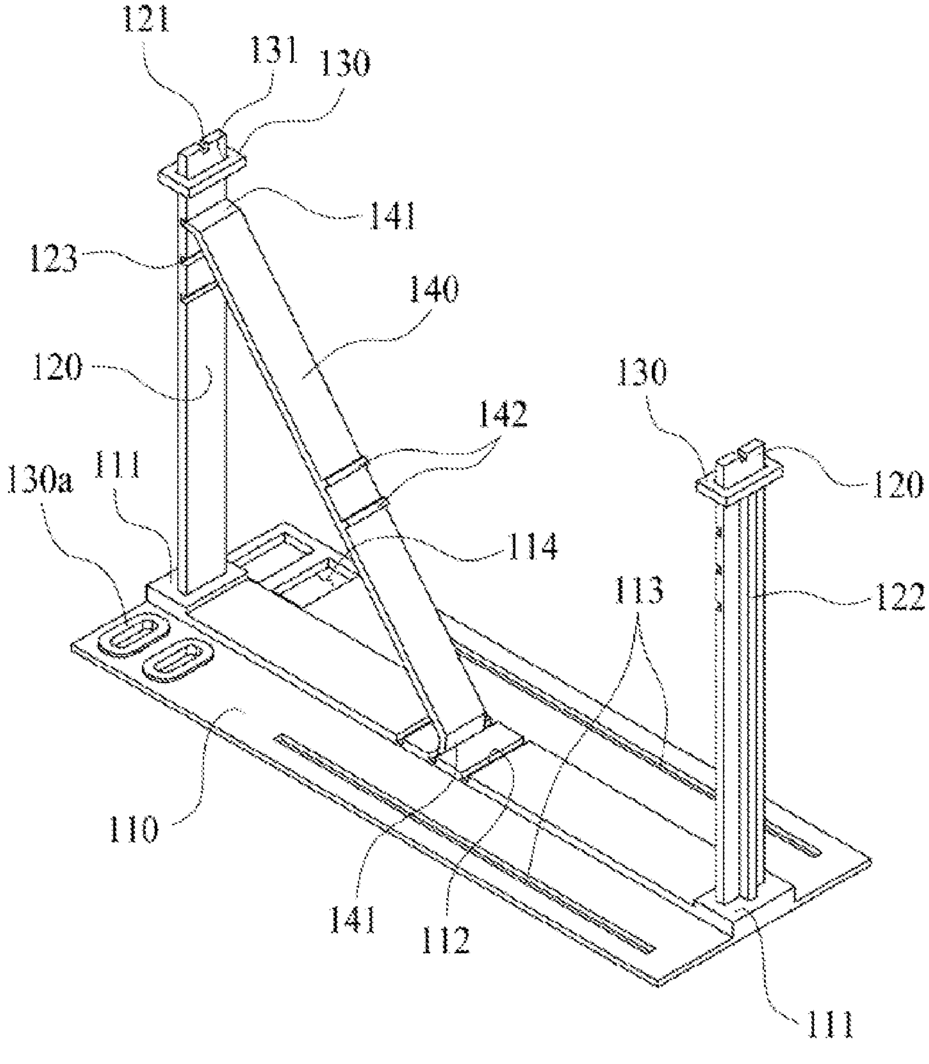
FIG. 1 is a perspective view of a teaching aid for knotting practice according to an embodiment of the invention.

The above and other objects, features and advantages of the present invention will be more clearly understood from the following detailed description taken in conjunction with the accompanying drawings.

The terms or words used in the specification and claims must not be limited to typical or dictionary meanings, but must be regarded as concepts selected by the inventor as concepts which best illustrate the present invention, and must be interpreted as having meanings and concepts adapted to the scope and spirit of the present invention to aid in understanding the technology of the present invention.

The terms used in the following description and claims are intended to merely describe specific embodiments, but not intended to limit the invention.

It should be understood that, in the terms used in the present specification, a singular expression includes a plural expression unless a description to the contrary is specifically pointed out in context, and the terms such as "include" are merely intended to indicate that features, numbers, steps, operations, components, parts, or combinations thereof are present and are not intended to exclude a possibility that one or more other features, numbers, steps, operations, components, parts, or combinations thereof will be present or added.

Additionally, when stating that a portion, such as a layer, film, area, or plate, is "above" another part, this not only includes cases where it's directly above but also when there's another part in between. Conversely, when stating that a part is "below" another part, this includes cases where it's directly below and those with another part in between.

It will be understood that terms, such as "first" or "second" may be used in the specification to describe various components but are not restricted to the above terms. The terms may be used to discriminate one component from another component.

Hereinafter, referring to the drawings for a detailed explanation of the embodiments of the invention, the same components will be marked with the same symbols, and for clarity, primarily different parts will be explained.

Figure 2:
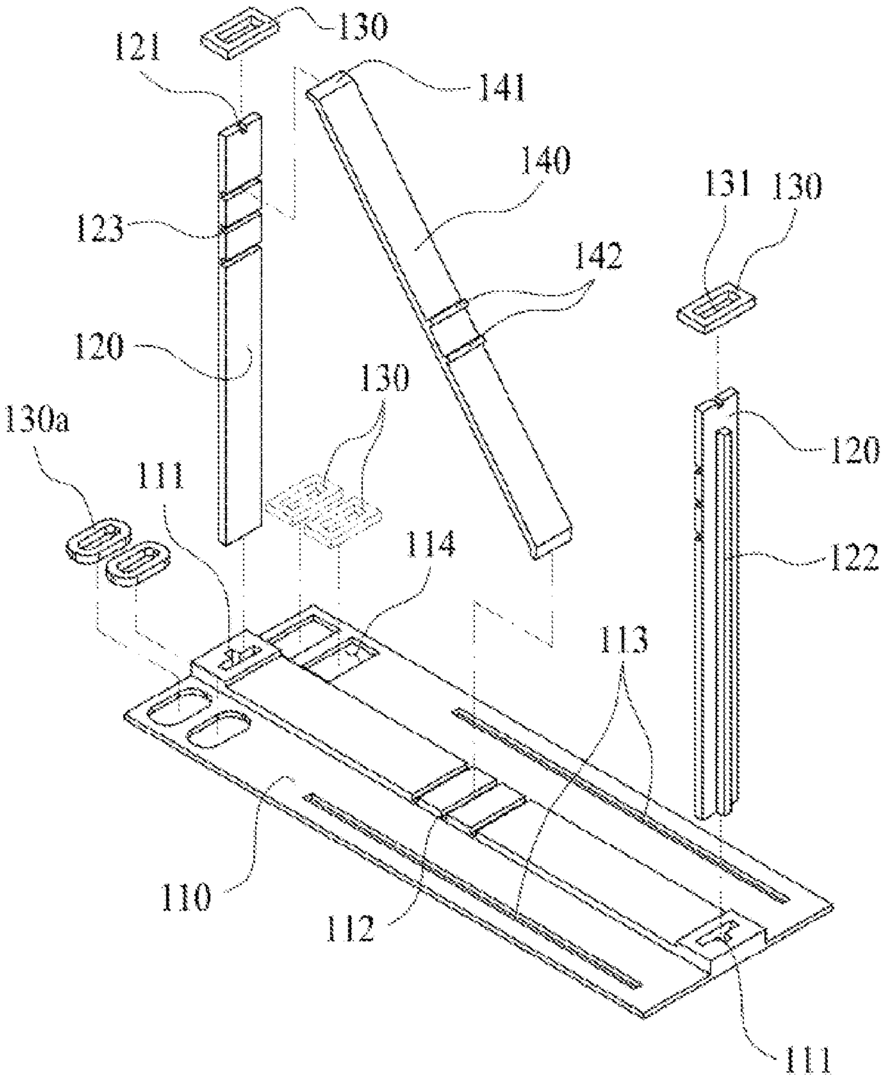
FIG. 2 is an exploded perspective view of FIG. 1.
Figure 3:
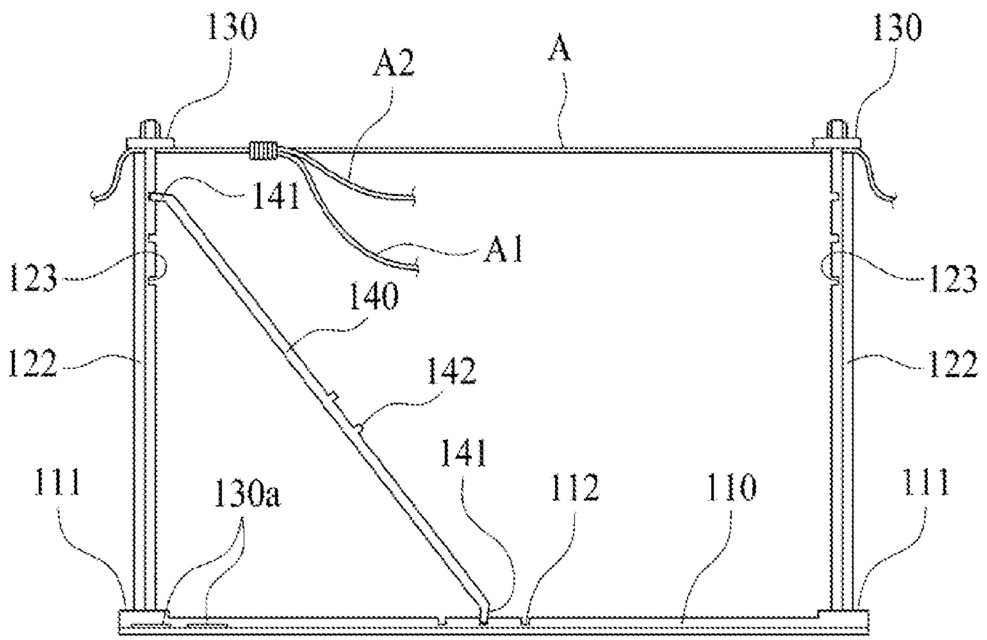
FIG. 3 is a side view of a used state of FIG. 1.

FIG. 1 is a perspective view of a teaching aid for knotting practice according to an embodiment of the invention, FIG. 2 is an exploded perspective view of FIG. 1, and FIG. 3 is a side view of a used state of FIG. 1. As illustrated, the teaching aid for knotting practice of the invention includes a bottom plate 110, string supporters 120, fixing clips 130 and 130*a*, and a inclined supporter 140.

The bottom plate 110 is placed on a table during knot practice.

The string supporters 120 are vertically coupled to an upper portion of the bottom plate 110. In the drawings, the string supporters 120 are coupled to both sides of the bottom plate 110 to face each other, but are not limited thereto, and may be coupled only to one side of the bottom plate 110.

In the drawings, the string supporter 120 has a rectangular cross-section having the front surface facing the bottom plate 110 and the rear surface facing the side end of the bottom plate 110, but is not limited thereto, and may have various cross-sectional shapes.

The string supporter 120 has a string hanging groove 121 formed at the upper portion thereof. A string used during knotting practice is placed on the upper end of the string supporter 120 through the string hanging groove 121.

Each of the fixing clips 130 and 130*a* is fit on the upper end of the string supporter 120 to restrict the movement of the string placed in the string hanging groove 121.

A through-hole 131 through which the upper end of the string supporter 120 passes is formed in the center of each of the fixing clips 130 and 130*a*. Since the string placed in the string hanging groove 121 must pass through the through-hole 131, the through-hole 131 must be formed in a size to be spaced a predetermined distance from the string supporter 120 in consideration of the thickness of the string.

Therefore, when the string is fitted into the string hanging groove 121 and each of the fixing clips 130 and 130*a* is fitted onto the upper end of the string supporter 120, the upper end of the string supporter 120 and the string both pass through the through-hole 131 of each of the fixing clip 130 and 130*a*. During the above process, the string is pressed against the front surface and the rear surface of the string supporter 120, a path of the string is bent, and the movement of the string is severely restricted.

On the other hand, to maintain a constant contact pressure between the string supporter 120 and the string, an interval between the through-hole 131 and the string supporter 120 should vary depending on the thickness of the string.

That is, if the string is thin, the through-hole 131 is formed small, and if the string is thick, the through-hole 131 is formed large.

Therefore, the fixing clips 130 and 130*a* may have different specifications depending on the size of the through-hole 131.

Furthermore, it is preferable to form strength-reinforcing ribs 122 on the rear surface of the string supporter 120 in the vertical direction.

In this case, the strength-reinforcing ribs 122 are formed from a point spaced a predetermined distance from the top of the string supporter 120 to prevent interference with the fixing clips 130 and 130*a* fitted to the top of the string supporter 120 and extends to the bottom of the string supporter 120.

The strength-reinforcing ribs 122 enhance the structural strength of the string supporter 120 and support the bottom of the fixing clips 130 and 130*a*, thereby preventing the fixing clips 130 and 130*a* from sliding down along the string supporter 120 and releasing the string.

Meanwhile, for user convenience, the string supporter 120 can be detachably attached to the bottom plate 110.

In this case, the bottom plate 110 has a coupling groove 111 into which the bottom of the string supporter 120 is inserted. In the case that the strength-reinforcing rib 122 is formed on the string supporter 120, both the string supporter 120 and the strength-reinforcing rib 122 are inserted into the coupling groove 111. In this instance, the coupling groove 111 is formed to tightly wrap around the bottom of the string supporter 120 and the strength-reinforcing rib 122 to prevent the movement of the string supporter 120.

Furthermore, a point of the bottom plate 110 where the coupling groove 111 is formed can be raised higher than the surrounding area. In this case, the depth of the coupling groove 111 increases, and the bottom of the string supporter 120 is inserted more deeply into the coupling groove 111.

Therefore, the coupling force between the string supporter 120 and the bottom plate 110 is doubled, and the string supporter 120 can maintain a more stable connection to the bottom plate 110.

Meanwhile, it is preferable to form a string supporter storage groove 113 for the string supporter on the bottom plate 110 into which the strength-reinforcing rib 122 is inserted.

In this case, the string supporter 120 separated from the bottom plate 110 can be laid flat and stored in close contact with the bottom plate 110, thereby making storage and organization of the string supporter 120 easier, enabling the user to carry it conveniently, and removing the risk of loss.

The inclined supporter 140 is coupled to the upper portion of the bottom plate 110 and supports the string supporter 120.

The inclined supporter 140 supports the front side of the string supporter 120.

Moreover, the inclined supporter 140 can be detachably combined with the bottom plate 110.

In this case, support protrusions 141 are respectively formed on the top and the bottom of the inclined supporter 140, and a plurality of retaining grooves 112 and 123 into which the support protrusions 141 are inserted are respectively formed on the bottom plate 110 and the string supporter 120.

Furthermore, if the plurality of retaining grooves 112 and 123 are formed at regular intervals, it allows the user to change a support angle of the inclined supporter 140 according to the user's preference, thereby enhancing convenience in use.

On the other hand, preferably, the inclined supporter 140 includes insertion protrusions 142 to be fit into the retaining grooves 112 formed in the bottom plate 110.

In this case, the inclined supporter 140 can be laid flat and stored in close contact with the bottom plate 110, thereby making storage and organization of the inclined supporter 140 easier, enabling the user to carry it conveniently, and removing the risk of loss.

Furthermore, fixing clip storage recesses 114 for storing the fixing clips 130 and 130*a* can be formed in the bottom plate 110.

In this case, the fixing clips 130 and 130*a* separated from the string supporters 120 can be inserted and stored in the bottom plate 110, thereby making storage and organization of the fixing clips 130 and 130*a* easier, enabling the user to carry them conveniently, and removing the risk of loss.

As described above, the teaching aid for knotting practice enables the user to hang a base string A, which is the base of a knot, on both of the string supporters 120, tighten the string using the fixing clips 130 and 130*a*, and make knots in various ways using different knot strings A1 and A2.

Furthermore, because the base string (A) is fixed at a certain height from the bottom plate 110 without movement, handling the strings becomes easier and both hands are free, thereby making knot-practicing very convenient.

In addition, even if the string is pulled to create a knot, since the inclined supporter 140 robustly supports the string supporter 120 and the string supporter 120 has the strength reinforcing rib 122 formed on the string supporter 120, the user can practice the knotting method in a stable state without the string supporter 120 bending or breaking.

As described above, when the user experiences making knots with other knot strings A1 and A2 in the condition that there is the base string A the teaching aid for knotting practice according to the present invention can be usefully utilized. Moreover, preferably, when packaging the teaching aid for knotting practice for sale, the base string A and the knot strings A1 and A2 can be packaged together in a set, thereby allowing users to easily experience immediately upon purchase.

Figure 4:
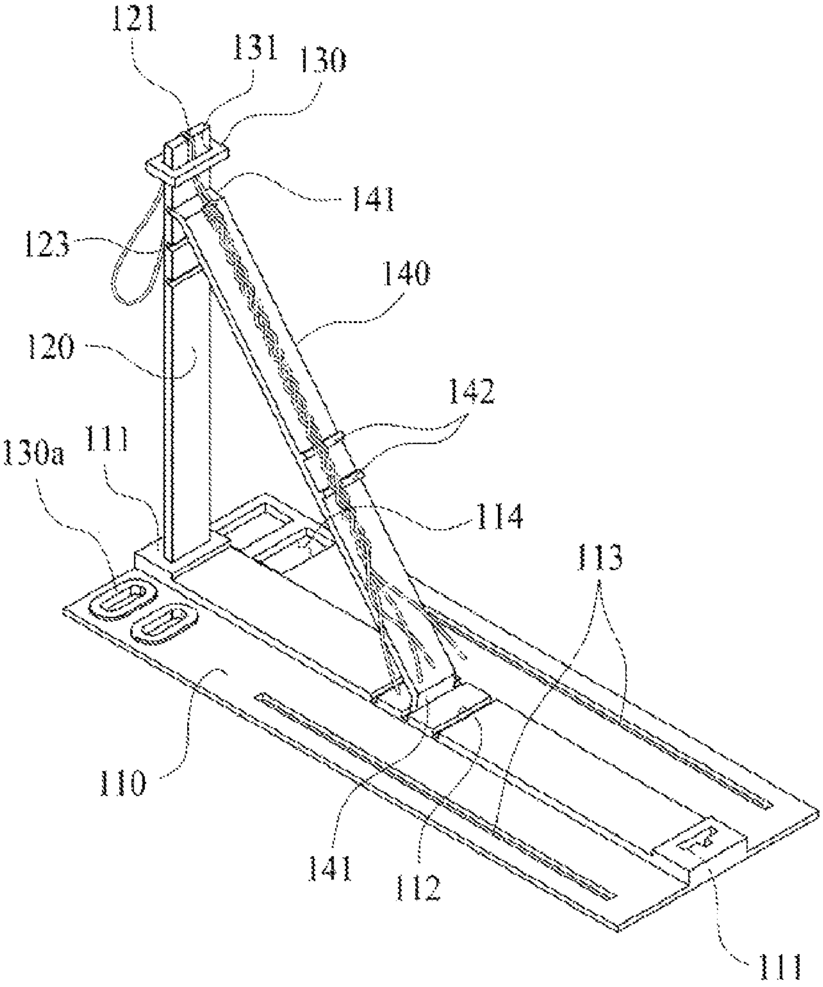
FIG. 4 is a perspective view of the used state of the teaching aid for knotting practice according to an embodiment of the invention, showing the condition where only one side has a string supporter.

As illustrated in FIG. 4, when the user practices knotting methods that do not require the base string A, or in a case that the knotting process has advanced considerably and it is more convenient to work with the knotted ornament stretched out long, there is no need to install string supporters 120 on both sides of the bottom plate 110. Instead, the string supporter 120 is installed on one side of the bottom plate 110, the strings necessary for knotting are placed on the string hanging groove 121, and then fix the strings with the fixing clips 130 and 130*a* to practice knotting.

Figure 5:
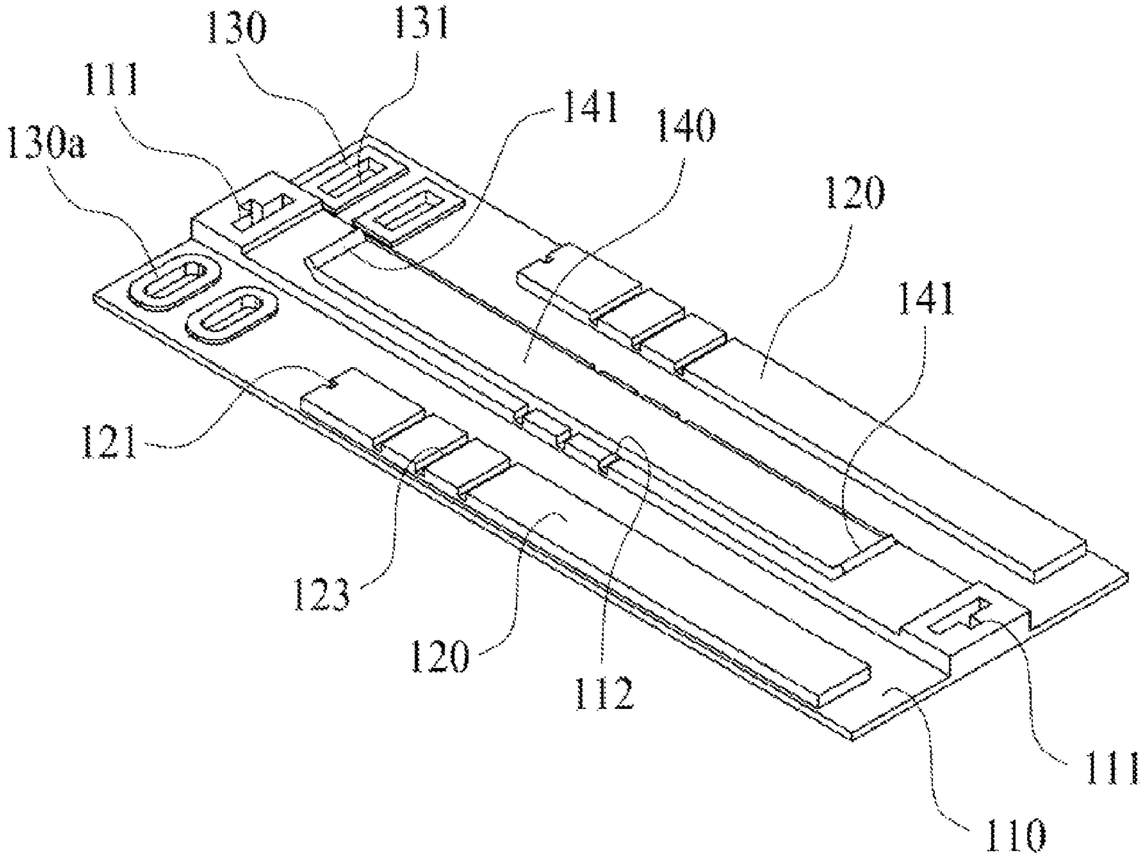
FIG. 5 illustrates a stored state of the teaching aid for knotting practice according to an embodiment of the invention.

FIG. 5 illustrates a stored state of the teaching aid for knotting practice according to an embodiment of the invention. As illustrated in the drawing, after the knotting practice is finished, the fixing clips 130 and 130*a* are separated from the string supporters 120, and then, are stored and organized in the fixing clip storage recesses 114 of the bottom plate 110. Subsequently, the string supporters 120 are separated from the bottom plate 110, and then, the strength-reinforcing rib 122 is stored and organized in the string supporter storage groove 113 of the bottom plate 110. Then, the insertion protrusion 142 of the inclined supporter 140 is stored and organized in the retaining groove 112 of the bottom plate 110.

In this case, since the fixing clips 130 and 130*a*, string supporters 120, and the inclined supporter 140 are stored lying flat on the bottom plate 110, the teaching aid for knotting practice does not occupy a large storage area, are neatly organized, are easy to carry, and has no risk of loss.

Figure 6:
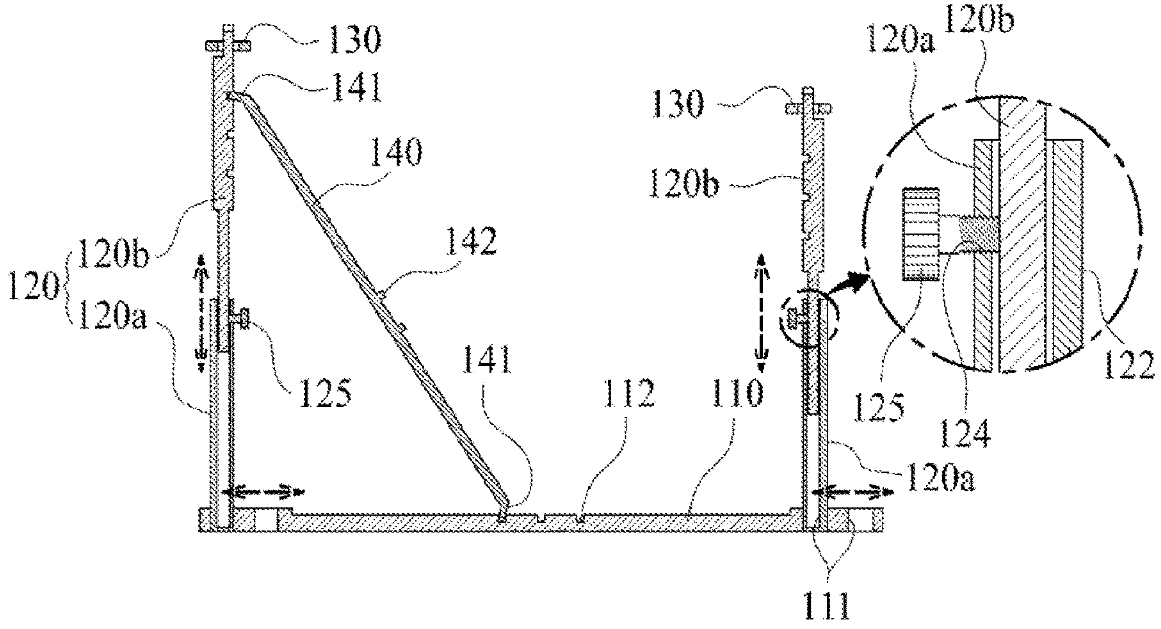
FIG. 6 is a cross-sectional view of a teaching aid for knotting practice according to another embodiment of the invention.

FIG. 6 is a cross-sectional view of a teaching aid for knotting practice according to another embodiment of the invention. As illustrated in the drawing, the string supporters 120 can be configured to be adjustable in height.

In this case, the string supporter 120 is divided into a lower body 120*a* and an upper body 120*b* which fits inside the lower body 120*a*, wherein a threaded hole 124 in which a tightening screw 125 can be coupled can be formed in the upper body 120*b*.

Therefore, the user can freely adjust the height of the string supporters 120 using the tightening screw 125 and fully engage in knotting practice.

Additionally, the coupling groove 111 formed in the bottom plate 110 may be formed in multiples at regular intervals along the side of the bottom plate 110. In this case, the user can freely choose and adjust the position and spacing of the string supporters 120 according to the user's preference while doing knotting practice.

The exemplary embodiments of the present invention have been described in more detail with reference to the accompanying drawings, but the present invention is not limited to the exemplary embodiments, and may be variously modified and carried out within the scope of the technical spirit of the present invention, and the changes and modifications belong to the scope of the present invention.

SEQUENCE LIST

110 . . . bottom plate 111 . . . coupling groove
112,123 . . . retaining groove 113 . . . string supporter storage groove
114 . . . fixing clip storage groove
120 . . . string supporter 121 . . . string hanging groove
122 . . . strength-reinforcing rib 130,130*a* . . . fixing clip
140 . . . inclined supporter 141 . . . support protrusion
142 . . . insertion protrusion

The invention claimed is:

1. A teaching aid for knotting practice comprising:
a bottom plate;
a string supporter which is vertically coupled to an upper portion of the bottom plate and having a string hanging groove formed from the top thereof;
a fixing clip which is fitted into the top of the string supporter to restrict the movement of a string hung on the string hanging groove; and
an inclined supporter which is detachably coupled to the upper portion of the bottom plate to support the string supporter,
wherein support protrusions are respectively formed on upper and lower portions of the inclined supporter, and wherein a plurality of retaining grooves into which the support protrusions are respectively inserted are formed on the bottom plate and the string supporter, respectively.

2. The teaching aid for knotting practice according to claim 1, wherein the string supporter is coupled to at least one of two sides of the bottom plate.

3. The teaching aid for knotting practice according to claim 2, wherein the string supporter has a strength-reinforcing rib formed in the vertical direction.

4. The teaching aid for knotting practice according to claim 3, wherein the string supporter is detachably coupled to the bottom plate, and wherein the bottom plate has a coupling groove formed therein to allow the bottom of the string supporter to be inserted.

5. The teaching aid for knotting practice according to claim 4, wherein the bottom plate has a string supporter storage groove formed therein in which the strength-reinforcing rib is inserted to store the string supporter in a state in which the string supporter is laid flat on the bottom plate after being detached from the coupling groove.

6. The teaching aid for knotting practice according to claim 1, wherein the inclined supporter has an insertion protrusion formed therein so that the inclined supporter can be stored by being fitted into one of the plurality of retaining grooves formed in the bottom plate when not in use.

7. The teaching aid for knotting practice according to claim 1, wherein the bottom plate has a fixing clip storage groove formed therein to store the fixing clip therein.

* * * * *